(12) United States Patent
Li

(10) Patent No.: US 8,331,698 B2
(45) Date of Patent: Dec. 11, 2012

(54) ETHNICITY CLASSIFICATION USING MULTIPLE FEATURES

(75) Inventor: Jia Li, North York (CA)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 12/755,576

(22) Filed: Apr. 7, 2010

(65) Prior Publication Data

US 2011/0249891 A1    Oct. 13, 2011

(51) Int. Cl.
*G06K 9/00* (2006.01)
*G06K 9/56* (2006.01)
*G06K 9/62* (2006.01)

(52) U.S. Cl. ......... 382/224; 382/118; 382/190; 382/205

(58) Field of Classification Search .................. 382/118, 382/190, 205, 224–228
See application file for complete search history.

(56) References Cited

U.S. PATENT DOCUMENTS

| | | | |
|---|---|---|---|
| 7,505,621 B1 | 3/2009 | Agrawal et al. | |
| 7,711,155 B1 * | 5/2010 | Sharma et al. | 382/118 |
| 7,848,548 B1 * | 12/2010 | Moon et al. | 382/118 |
| 7,912,246 B1 * | 3/2011 | Moon et al. | 382/103 |
| 2007/0058870 A1 | 3/2007 | Liang et al. | |
| 2007/0229498 A1 | 10/2007 | Matusik et al. | |
| 2010/0202699 A1 * | 8/2010 | Matsuzaka et al. | 382/195 |
| 2011/0249891 A1 * | 10/2011 | Li | 382/165 |

FOREIGN PATENT DOCUMENTS
WO      0109821 A1    2/2001

OTHER PUBLICATIONS

Mixture of Experts for Classification of Gender, Ethnic Origin, and Pose of Human Faces, Srinivas Gutta, Jeffrey R. J. Huang, P. Jonathon and Harry Wechsler, IEEE Transactions on Neural Networks, vol. 11, No. 4, Jul. 2000, (pp. 948-960).
Face Detection and Eye Location Using a Modified Alisa Texture Module, Teddy Ko and Peter Bock, Department of Computer Science, The George Washington, University, IEEE, Oct. 2001, (pp. 187-193).
Ethnicity Identification from Face Images, Xiaoguang Lu and Anil K. Jain, Department of Computer Science & Engineering, Michigan State University, Apr. 2004.
Ethnicity Estimation with Facial Images, Satoshi Hosoi, Erina Takikawa and Masato Kawade, Vision Sensing Technologies, Sensing Technology Laboratory, Omron Corporation, IEEE Computer Society, Proceedings of the Sixth IEEE International Conference on Automatic Face and Gesture Recognition, May 2004.
Demographic Classification with Local Binary Patterns, Zhiguang Yang and Haizhou AI, Department of Computer Science and Technology, Tsinghua University, Beijing, China, Aug. 2007, (pp. 464-473).
Gender and Ethnic Classification of Human Faces Using Hybrid Classifiers, Srinivas Gutta, Philips Research Labs, New York, and Harry Wechsler, Department of Computer Science, George Mason University, Virginia, Jul. 2009, (pp. 4084-4089).

\* cited by examiner

*Primary Examiner* — Aaron W Carter

(57) ABSTRACT

Frontal face images are classified into four categories such as Asian, Caucasian, African and others. A new representation of face appearance, named BITF (Block Intensity and Texture Feature), is employed as the discrimination feature. An ensemble of three component classifiers, each trained with a different number of BITF features as inputs, is designed to achieve a reliable classification. Further reliability is obtained by taking into consideration other secondary features to boost the classification performance.

17 Claims, 7 Drawing Sheets

ETHNICITY CLASSIFICATION USING MULTIPLE FEATURES

BACKGROUND

Field of Invention

The technology of classifying frontal face images by gender, age or race has increasing attracted attention because of its promising application in consumer market research and access control. Fewer research studies in race classification or ethnicity identification have been published as compared to gender and age classification.

Studies of human's perception and cognition capability to distinguish faces from different races show that eyebrow, nose, mouth and some anthropometric measurements play important roles. However all measurements require accurate feature identification. Therefore most published works focus on studies that attempt to classify ethnic origin using features with minimum requirement for facial point detection. Those features include PCA (principal component analysis) or Gabor wavelet representation of normalized face images. Most approaches are designed to classify two categories of ethnicity. For example, in "Ethnicity Identification from Face Images" Lu, X., Jain, A. (April, 2004) Linear Discriminant Analysis (LDA) is applied to the face region at three different resolutions to detect Asian and non-Asian subjects, each of which has relatively distinct anthropometrical features.

In another Asian-nonAsian classification method PCA is used for feature generation and ICA (independent component analysis) is used for feature extraction. The system is a combination of SVM (support vector machine) classifiers and claims a classification rate of 82.5% on a database containing 750 face images from the Facial Recognition Technology (FERET) database.

SUMMARY OF INVENTION

In the present invention, a new approach is proposed to classify frontal face images into four categories such as Asian, Caucasian, African and others. A new representation of face appearance, named BITF (Block Intensity and Texture Feature), is employed as the discrimination feature. An ensemble of three component classifiers, each trained with a different number of BITF features as inputs, is designed to achieve a reliable classification. Further reliability is obtained by taking into consideration other secondary features to boost the classification performance.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
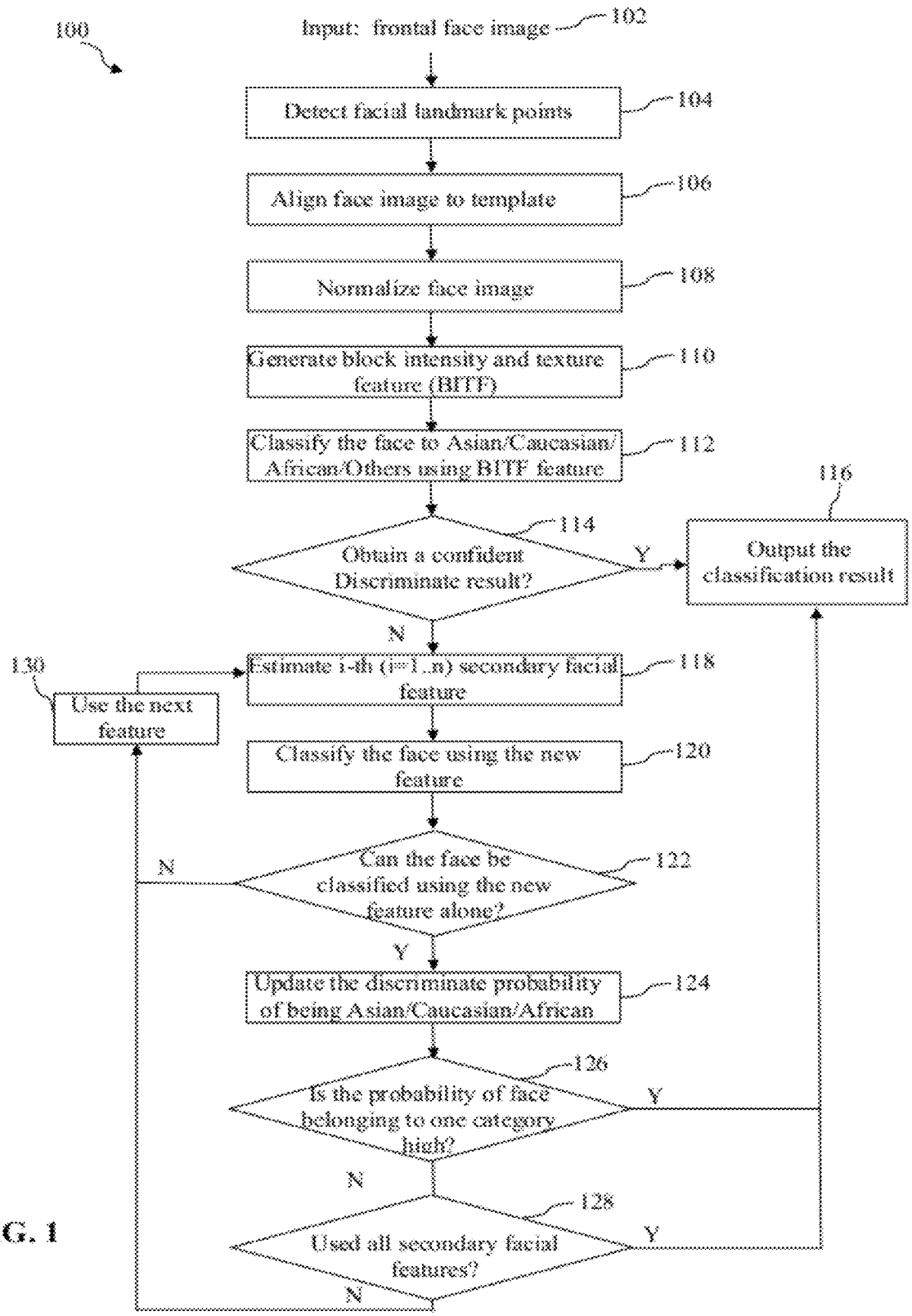
FIG. 1 is a flowchart of the general method of the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for ethnic classification of human faces in images. Example embodiments can be used in conjunction general purpose systems in stores, for example, that target advertisements based on the foot traffic going through the store, or security systems in airport terminals.

Example embodiments classify human images by evaluating particular features. Methods consistent with the invention may be implemented in image capture devices such as scanners or digital camera based systems, as well as in software modules in a host computer of the advertisement or security system.

With reference now to FIG. 1, an example method 100 for ethnicity classification is disclosed. More particularly, the example method 100 identifies features in the image of the human face and determines whether the face falls in one of four classifications, including Asian, Caucasian, African, or other.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include an image capture device, such as a camera or scanner. Alternatively, a computer connected to the image capture device may include one or more computer-readable media that implement the example method 100.

Figure 2:
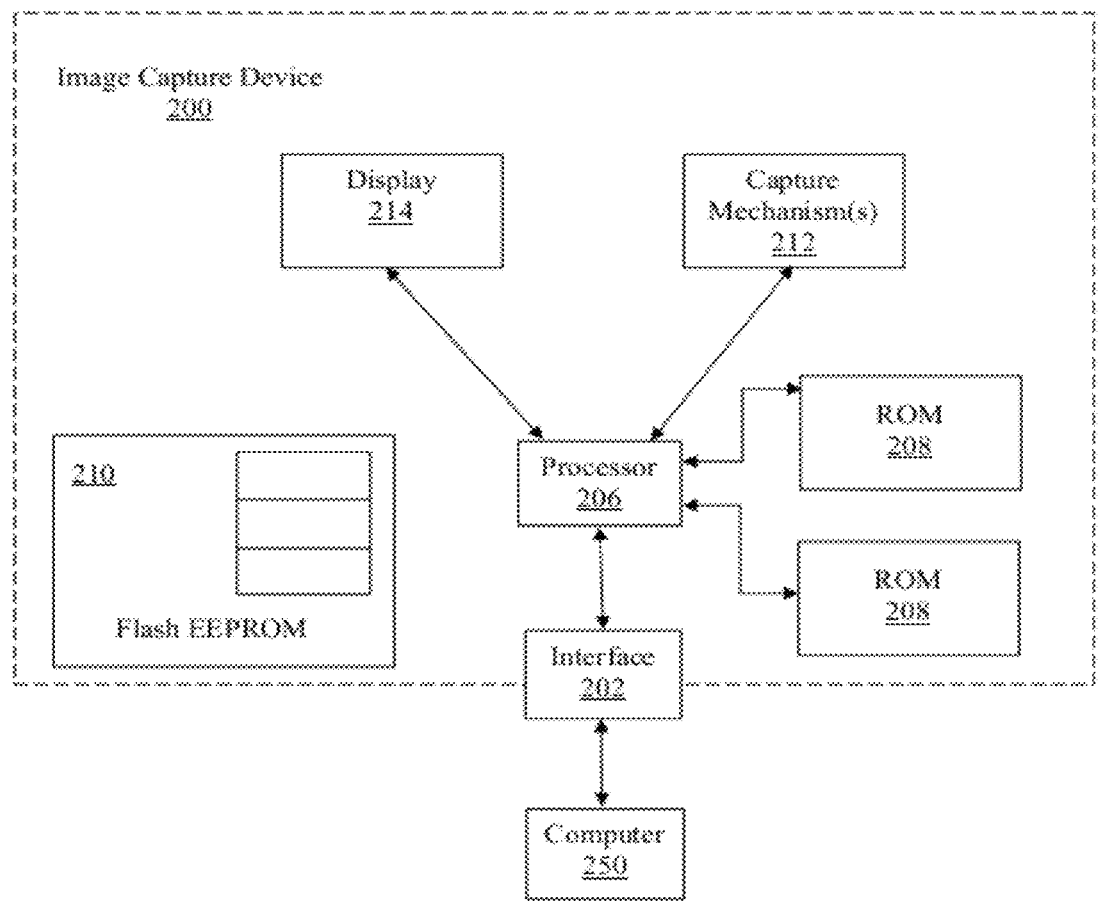
FIG. 2 is a general block diagram of an image capture device and system for utilizing the present invention.

A schematic representation of an example image capture device 200 is disclosed in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital photographic image. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a digital image, for example, the processor 206 can implement the methodological acts of the method 100 on the digital image to classify the image. Further processing in an imaging pipeline may then be performed to create a legend that identifies the ethnicity of the human face (such as Asian, Caucasian, African, or other) that is displayed by the image capture device 200 on a display 214, such as an LCD display for example, or transferred to the host computer 250, for example.

The example method 100 for detecting the ethnicity of a human face in an image will now be discussed in connection with FIG. 1. Prior to performing method 100, an input image can be targeted for various image processing operations such as alignment of the human face to a template. The input image may be a digital color image or a digitized or scanned version of a color image. Various image processing techniques may be applied to the input image before method 100 is performed.

Before discussing the present invention we will first discuss the problem with a prior art solution used in human face recognition, i.e. eigenfaces. Eigenfaces are a set of eigenvectors used in computer vision human face recognition. A set of eigenfaces can be generated by performing a mathematical process called principal component analysis (PCA) on a large set of images depicting different human faces. Eigenfaces can be thought of as a set of "standardized face features", derived from statistical analysis of many pictures of faces. Any human face can be considered to be a combination of these standard features.

To create a set of eigenfaces, one must:

(1) Prepare a training set of face images. The pictures constituting the training set should have been taken under the same lighting conditions, and must be normalized to have the eyes and mouths aligned across all images. They must also be all resampled to the same pixel resolution. Each image is treated as one vector, simply by concatenating the rows of pixels in the original image, resulting in a single row with r×c elements. For this implementation, it is assumed that all images of the training set are stored in a single matrix T, where each row of the matrix is an image.

(2) Subtract the mean. The average image a has to be calculated and then subtracted from each original image in T.

(3) Calculate the eigenvectors and eigenvalues of the covariance S. Each eigenvector has the same dimensionality (number of components) as the original images, and thus can itself be seen as an image. The eigenvectors of this covariance matrix are therefore called eigenfaces. They are the directions in which the images differ from the mean image. Usually this will be a computationally expensive step, but the practical applicability of eigenfaces stems from the possibility to compute the eigenvectors of S efficiently, without ever computing S explicitly.

(4) Choose the principal components. The D×D covariance matrix will result in D eigenvectors, each representing a direction in the r×c-dimensional image space. The eigenvectors (eigenfaces) with largest associated eigenvalue are kept.

These eigenfaces can now be used to represent both existing and new faces: one can project a new (mean-subtracted) image on the eigenfaces and thereby record how that new face differs from the mean face.

The input face image (new face) is first aligned to a small template that is, for example, 44×48 inches (width×height dimensions). The alignment is done by using a few of facial landmarks for example eye centers, the mouth center or points on the face line. Then the intensity distribution of the aligned image is normalized in order to eliminate the lighting variance across the face image. Each normalized face image will have a feature vector created by concatenating its image pixels. Then PCA is applied on the feature vector of all images in training to extract the information that reserves the most variance. It results in a new feature vector that is smaller in size so that the classifier can be trained with a small or medium-scale image set. However, since eigenface is a pixel-level feature, it is not robust against misalignment caused by inaccurate facial landmark (eye/mouth) point detection.

To overcome this weakness of eigenface we designed an alternative feature that can be extracted from the same normalized face images. It is Block Intensity and Texture feature.

The first step in the present invention is input a frontal face image (step 102 in FIG. 1). The frontal face image is in the form of digital image data that can be obtained from the capture mechanisms 212 (e.g. camera or scanner), or can be an image previously stored in flash EEPROM 210 or ROM 208. The frontal face image is input to processor 206 for ethnicity classification processing as described below, or the frontal face image can be transferred to computer 250 for the ethnicity classification processing.

The next step in the ethnicity classification processing is detection of facial landmark points (step 104). The facial landmark points can be generated by any known classifier. The present invention is not limited to or concerned with any particular feature classifier and any known classifier such as those based on an AdaBoost algorithm may be used to generate the facial landmark points.

At step 106, the face image is aligned to a template (see block 302 in FIG. 3) using a few facial landmark points (e.g. eye centers, mouth center).

At step 108, the intensity distribution of the aligned image is normalized to eliminate the lighting variance across the facial image.

As mentioned above, the present invention diverges from the standard eigenface process at this point. The present invention extracts an alternative feature, the Block Intensity and Texture feature, from the same normalized face images generated in the known eigenface process. The step of generating a block intensity and texture feature (BITF) is shown generally as step 110 in FIG. 1, but is described in detail below.

Figure 3:
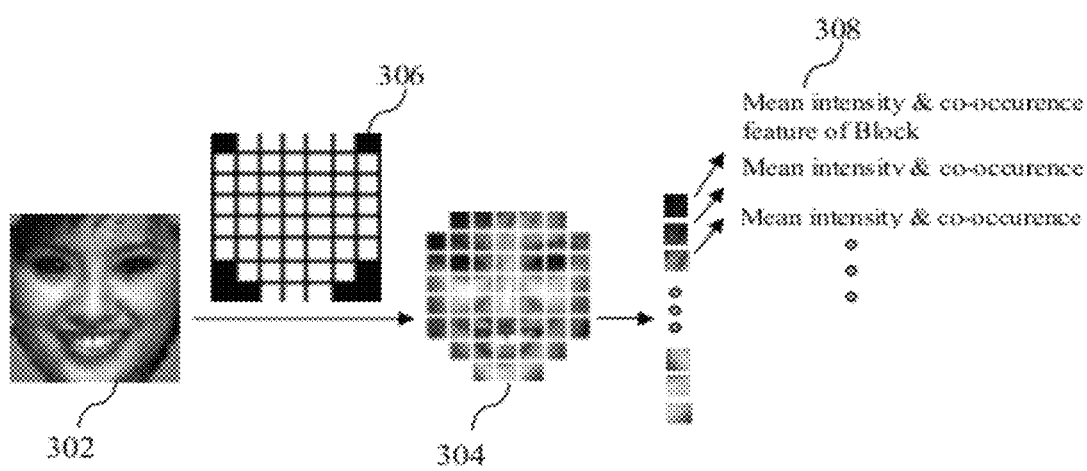
FIG. 3 illustrates the procedure for creating a BITF feature from a normalized face image.

The main steps to extract BITFs (Block Intensity and Texture features are) as follows:

Divide the normalized face image into non-overlapping blocks of size n×m (304 in FIG. 3). Some blocks at the image corner (shown as black squares 306 in FIG. 3) are not used in the following steps because they often contain noisy background.

Calculate the mean intensity of each block of pixels.

Calculate the co-occurrence matrix of each block to describe texture (308 in FIG. 3). (This step is described in greater detail below.)

Concatenate the mean intensities and co-occurrence matrices of all blocks to generate one feature vector.

A co-occurrence matrix is a matrix that is defined over an image to be the distribution of co-occurring values at a given offset. Mathematically, a co-occurrence matrix C is defined over an n×m image I, parameterized by an offset (Δx,Δy), as:

$$C_{\Delta x, \Delta y}(i, j) = \sum_{p=1}^{n} \sum_{q=1}^{m} \begin{cases} 1, & \text{if } I(p,q) = i \text{ and } I(p + \Delta x, q + \Delta y) = j \\ 0, & \text{otherwise} \end{cases}$$

The "value" of the image can be referred to as the grayscale value of the specified pixel. The value could be anything, from a binary on/off value to 32-bit color.

To achieve the best BITF feature in terms of size and discriminate capability the following parameters were adjusted: block size, intensity levels and pixel offset. In a preferred embodiment, normalized face images were generated in 44×48-pixel size. 48 blocks are defined over the new images and each block has 6×6 pixels. The co-occurrence matrix is calculated with 8 offsets. The intensity values are scaled to 5 levels by $$v = \text{floor}\left(\frac{I(p,q)}{40}\right) + 3$$

$$I'(p,q) = \begin{cases} 1, & \text{if } v < 1 \\ v, & \text{if } 5 \geq v \geq 1 \\ 5, & \text{if } v > 5 \end{cases}$$

Each block is described by one mean intensity value and a co-occurrence matrix that is 100-unit long. So we replace each normalized face image with a 4848 long feature vector.

The next step (step 112 in FIG. 1) is to classify the face using the 4848 long feature vector as one of four ethnicities: Asian, Caucasian, African, or other.

Figure 4:
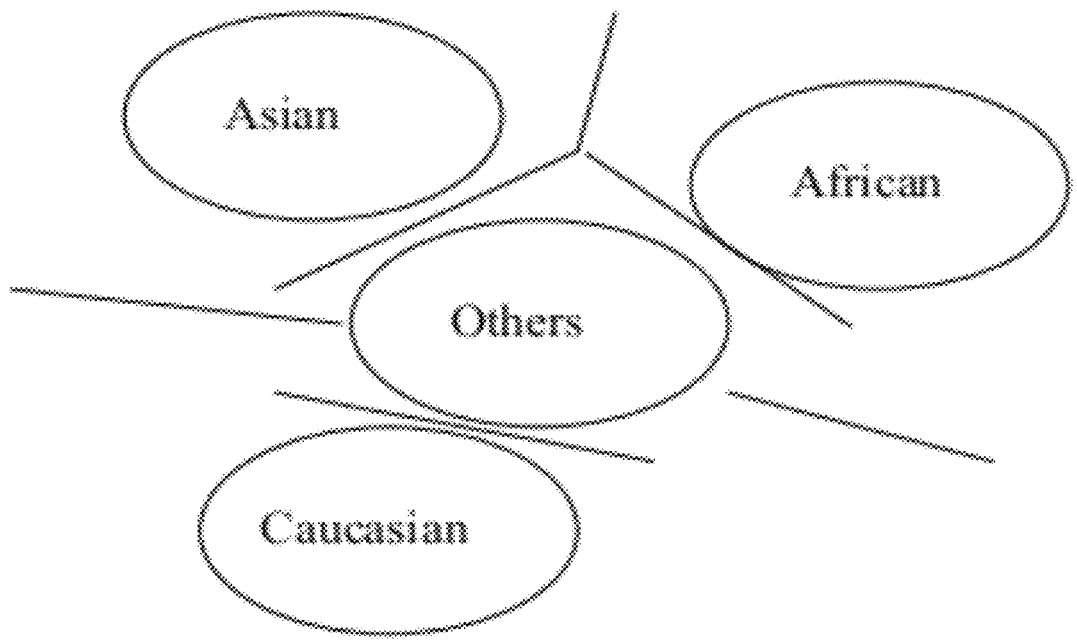
FIG. 4 shows the different decision boundaries of four ethnicities in the feature space.
Figure 5:
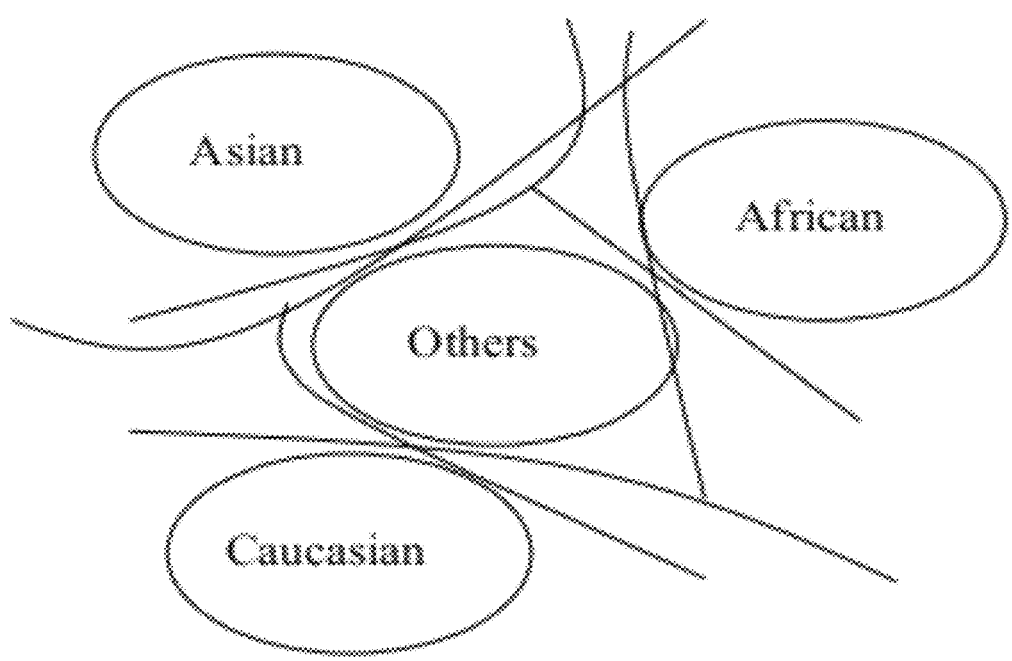
FIG. 5 shows the decision boundaries the present invention determines in a preferred embodiment.

Because each ethnicity has its own distinct appearance, which is different from one or two other races, as shown in FIG. 4 the decision boundaries among all races is hard to describe in one mathematical curve. Therefore the present invention examines the boundary between three triplets of ethnicity such as: Asian-Caucasian-non of Asian and Caucasian, Caucasian-African-non of Caucasian and African, Asian-African-non of Asian and African. Then the classification goal becomes to find three multi-part boundaries shown in FIG. 5.

Figure 6:
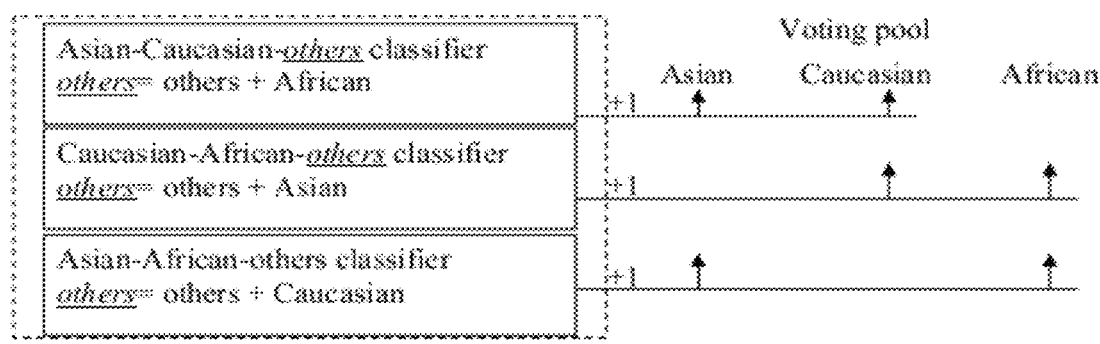
FIG. 6 illustrates the ensemble of three component classifiers and the voting scheme of the present invention.

FIG. 6 illustrates the ethnicity classifier ensemble that consists of three component classifiers and the voting scheme. The important characteristics of this ensemble are as follows.

Each classifier will give one vote to the class that the face is most similar to. For example, for a certain face the Asian-Caucasian-Others classifier believes this face ensemble belongs more to Caucasian, then its vote will go to Caucasian. If for another face the same classifier doesn't think it is close to either Asian or Caucasian, then none of Asian, Caucasian or African class will receive a vote from this classifier.

One class can get at most 2 votes from the 3 classifiers

The purpose of the voting is to associate the face with the class that has the highest vote.

If no class has a single vote, the face is "others."

If two classes have the same vote, the present invention chooses the one having the highest probability value The following is a description of three component classifiers shown in FIG. 6.

Each component classifier uses BITF features instead of eigenface because BITF features are less subject to alignment error. To reduce the feature size PCA (principal component analysis) is used to extract principle features from initial BITF features.

To solve each sub-classification problem an LDA (linear discriminant analysis) classifier is employed to find the best boundary between three classes During training of each classifier different principle features are automatically selected by 5-fold cross-validation. The Asian-Caucasian classifier and Caucasian-African classifier use 643 principle features while the Asian-African classifier uses 588 features.

In order to provide class-specific discrimination the present invention employs linear discriminant analysis (LDA) to process the BITF features. LDA is a well-known statistical method to project the given multidimensional data to a lower dimension such that the reshaped scatters of two classes are easier to separate. Fisher linear discriminate analysis is the LDA in two-class classification cases. The face feature X is projected by the transformation W as $Y=W^T X$, where Y is the new feature vector that has m dimension. The transformation matrix W is chosen to maximize the ratio of between-class scatter to within-class scatter.

$$W = \mathrm{argmax}_W \frac{W^T S_B W}{W^T S_W W},$$

$S_B$ is the between-class scatter and $S_W$ is the within-class scatter.

LDA classifiers are trained with a different number of BITF features. A 5-fold cross-validation method is used to evaluate the generalization capability of all resultant classifiers. The BITF feature set that yields the smallest generalization error will be chosen to use in the component classifier.

In the present invention, if the BITF feature classifier ensemble produces a confident result, e.g. one class gets two votes, then step 114 in FIG. 1 answers Yes and the classification result is output at step 116. However, if step 114 answers No, e.g. two classes get one vote from the BITF feature classifier ensemble, then the present invention moves to step 118 that looks at secondary features with the goal of reaching a satisfactory classification result.

The ethnicity discriminant using multiple secondary features will now be described.

As an example of secondary features, African face detector using skin tone and background luminance is described next.

Since Africans have darker skin than others it is intuitive to use skin color to detect Africans. However, skin color alone is not reliable because the skin color varies under different illumination. The present invention extracts skin tone features that are less variant under different illumination. They are the face skin color (l,a,b) in LAB space, the background intensity distribution (described in three values (v1,v2,v3)), and area of the color pixels in the background and their average saturation. The background intensity and color values are features that help judge whether or not the image is taken under normal lighting conditions.

In the present invention, a secondary feature, such as skin tone feature, is used to improve recognition of African faces when none of three classes received 2 votes from the appearance-based feature classifier ensemble. In FIG. 1, if 2 votes are received from the appearance-based feature classifier ensemble, then the invention has received a confident discriminante result at step 114 (answer Yes), and the classification result can be output step 116. However, if 2 votes are not received at step 114 (answer No). The process proceeds to step 118 where the first secondary feature is analyzed.

Figure 7:
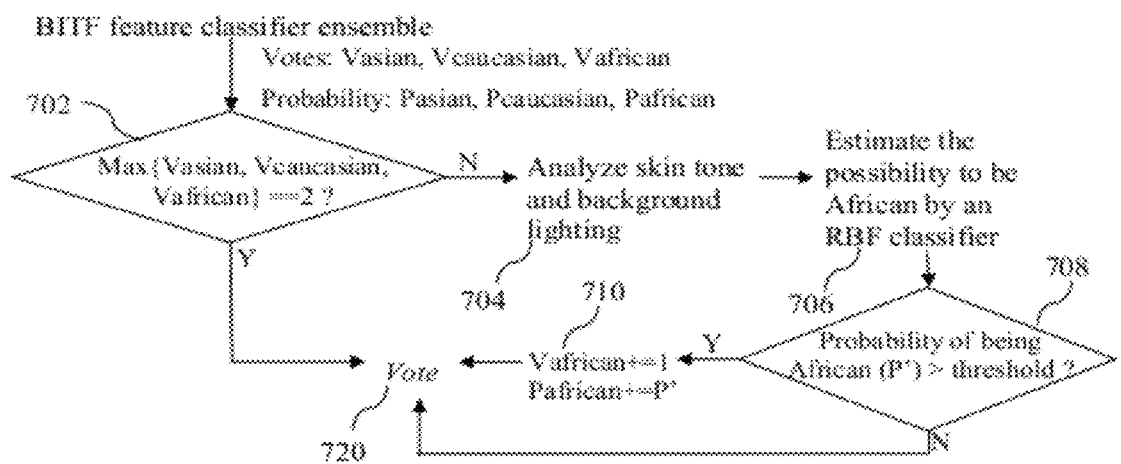
FIG. 7 illustrates the process of the present invention that uses secondary features (e.g. skin tone) to improve ethnicity classification.

FIG. 7 illustrates the processing flow. For example when the BITF feature classifier ensemble produces one vote for class Asian and one for African (step 702, FIG. 7), the skin tone and background features will be extracted (step 704) and the similarity of the face to African in the above feature space is estimated (step 706). The present invention then uses a radial basis function (RBF) classifier to classify the face using the "new" (secondary) feature (step 120, FIG. 1). If the RBF classifier judges the face is more likely African with a high probability (step 708, FIG. 7 and step 122, FIG. 1 answer Yes), then the class African will receive an additional vote (step 710, FIG. 7 and step 124, FIG. 1). Then all votes will be processed by the voting scheme described above to obtain the final discriminate decision (step 720). In this example, the input face is determined to be African since that category received two votes.

If the probability of the face belonging to one category is high (step 126, FIG. 1 answers Yes), e.g. one category now has two votes, then the classification result is output at step 116. However, if the probability of the face belonging to one category is not high (step 126, FIG. 1 answers No), e.g. one category still has only one vote, then the process continues to step 128. At this point, a check is made to see if other secondary facial features are available for consideration. Some of these other features are discussed below. If all secondary features have been considered (step 128 answers Yes), then the classification result is output at step 116. For example, if no class has a vote, the face is classified as "others." If two classes have the one vote form the BITF feature classifier and the secondary feature classification does not yield another vote to either class, then the face can be classified in two ethnicities, thus eliminating one ethnicity. A different strategy can be used in some applications, e.g. customer statistics, where the input face must be categorized into one ethnicity class. The probability of the face belonging to each class will be compared when no class has a majority vote. The highest probability indicates the best estimation of the face's ethnicity.

If all secondary features have not yet been considered (step 128 answers No). Then the process moves to step 130 and the next secondary feature is selected for consideration. The process then loops again through steps 118 to 124 until steps 126 or 128 answers Yes. As illustrated in step 118, assuming there are n secondary features, the process will continue until i=n.

In the present invention, other secondary features have been identified for use in improving classification, in addition to the skin tone feature. It will be appreciated that FIG. 7 is exemplary only, and shows the process for evaluating one particular secondary feature (skin tone) for one ethnicity (African). The same process steps would be used for each of the other secondary features listed below.

Use hair color (e.g. blonde/red hair) to detect Caucasian.

Use eye color (green/blue iris color) to detect Caucasian on large face images that are in normal lighting condition.

Use eyebrow to eye distance to improve separation between Asian and Caucasian. In the present invention this feature was analyzed in about 9000 face images that were collected from the web or public databases. As it is shown in the table below there is a detectable difference between Asian and Caucasian in terms of the normalized eyebrow to eye distance.

| Mean | Asian | Caucasian | African |
|---|---|---|---|
| Eyebrow to eye distance (normalized by eye separation) | 0.3518 | 0.2775 | 0.3128 |

In summary, the present invention classifies frontal face images into one of four ethnicities including Asian, Caucasian, African and others. Instead of representing the face appearance with normalized eigenfaces, a new representation named Block Intensity & Texture feature is created from the normalized face images. Principle Component Analysis (PCA) is used to generate features from this new face appearance, where an ensemble of three component classifiers is applied to solve the ethnicity task. The finial decision regarding the face ethnicity is made by a voting scheme based on the component classifier results. The proposed classification system can also accommodate other features such as skin color tone for improved classification accuracy.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for automatic ethnicity classification of a frontal face image comprising:
   aligning the frontal face image to a template;
   normalizing the aligned frontal face image;
   generating a block intensity and texture feature (BITF) from the normalized frontal face image, including
      dividing the normalized frontal face image into non-overlapping blocks of pixels,
      calculating a mean intensity of each block of pixels,
      calculating a co-occurrence matrix of each block of pixels to describe texture, and
      concatenating the mean intensities and co-occurrence matrices of all blocks to generate one feature vector; and
   using a BITF classifier ensemble to classify the frontal face image into one of four ethnicity classifications.

2. A method as recited in claim 1, further comprising:
   deciding if using the BITF classifier ensemble provides a confident discriminate result, and if the BITF classifier ensemble does not provide a confident discriminate result, then using a secondary classifier to classify a secondary feature.

3. A method as recited in claim 2, wherein the secondary feature comprises skin tone.

4. A method as recited in claim 2, wherein the secondary classifier is a radial basis function (RBF) classifier.

5. A method as recited in claim 2, further comprising:
   combining classification results of the BITF classifier ensemble and the secondary classifier to classify the frontal face image.

6. A method as recited in claim 5, further comprising:
   deciding if combining the classification results of the BITF classifier ensemble and the secondary classifier provides a confident discriminate result, and if combining the classification results of the BITF classifier ensemble and the secondary classifier does not provide a confident discriminate result, then using the secondary classifier to classify another secondary feature.

7. A method as recited in claim 6, further comprising:
   combining classification results of the BITF classifier ensemble, the secondary classifier classification using the secondary feature, and the secondary classifier classification using the another secondary feature to classify the frontal face image.

8. A method as recited in claim 6, wherein the another secondary feature comprises hair color, eye color, or eyebrow to eye distance.

9. A method as recited in claim 1 wherein the four ethnicity classifications comprise Asian, Caucasian, African, and others.

10. One or more non-transitory computer-readable media having computer-readable instructions thereon, which, when executed by a processor, implement a method for automatically classifying an ethnicity of a front facial image, comprising:
    aligning the frontal face image to a template;
    normalizing the aligned frontal face image;
    generating a block intensity and texture feature (BITF) from the normalized frontal face image;
    using a BITF classifier ensemble to classify the frontal face image into one of four ethnicity classifications; and
    deciding if using the BITF classifier ensemble provides a confident discriminate result, and if the BITF classifier ensemble does not provide a confident discriminate result, then using a secondary classifier to classify a secondary feature.

11. The one or more non-transitory computer-readable media as recited in claim 10, wherein generating a block intensity and texture feature (BITF) comprises:
    dividing the normalized frontal face image into non-overlapping blocks of pixels;
    calculating a mean intensity of each block of pixels;
    calculating a co-occurrence matrix of each block of pixels to describe texture; and
    concatenating the mean intensities and co-occurrence matrices of all blocks to generate one feature vector.

12. The one or more non-transitory computer-readable media as recited in claim 10, wherein the secondary classifier is a radial basis function (RBF) classifier.

13. The one or more non-transitory computer-readable media as recited in claim 10, further comprising:
    combining classification results of the BITF classifier ensemble and the secondary classifier to classify the frontal face image.

14. A device for automatic ethnicity classification of a frontal face image comprising:
    a processor that:
       aligns the frontal face image to a template;
       normalizes the aligned frontal face image;
       generates a block intensity and texture feature (BITF) from the normalized frontal face image, including
          dividing the normalized frontal face image into non-overlapping blocks of pixels,
          calculating a mean intensity of each block of pixels,
          calculating a co-occurrence matrix of each block of pixels to describe texture, and
          concatenating the mean intensities and co-occurrence matrices of all blocks to generate one feature vector; and
       uses a BITF classifier ensemble to classify the frontal face image into one of four ethnicity classifications.

15. The device as recited in claim 14, wherein the processor further:
    decides if using the BITF classifier ensemble provides a confident discriminate result, and if the BITF classifier ensemble does not provide a confident discriminate result then uses a secondary classifier to classify a secondary feature.

16. The device as recited in claim 15, wherein the secondary classifier is a radial basis function (RBF) classifier.

17. The device as recited in claim 15, wherein the processor further:
    combines classification results of the BITF classifier ensemble and the secondary classifier to classify the frontal face image.

* * * * *